United States Patent [19]

Glimpel

[11] 4,106,783
[45] Aug. 15, 1978

[54] CLAMPING DEVICE FOR ACCURATELY CENTERING A WORK-PIECE OR A TOOL

[75] Inventor: Helmut Glimpel, Lauf a.d. Pegnitz, Fed. Rep. of Germany

[73] Assignee: Emuge-Werk Richard Glimpel Fabrik fur Prazisionswerkzeuge vormals Moschkau & Glimpel, Lauf a.d. Pegnitz, Fed. Rep. of Germany

[21] Appl. No.: 782,688

[22] Filed: Mar. 30, 1977

[30] Foreign Application Priority Data

Mar. 30, 1976 [DE] Fed. Rep. of Germany ....... 2613526

[51] Int. Cl.² ............................................ B23B 31/40
[52] U.S. Cl. ................................... 279/2 R; 269/48.1
[58] Field of Search .................... 279/2 R, 2; 269/48.1

[56] References Cited

U.S. PATENT DOCUMENTS 2,523,972  9/1950  Sharratt ............................. 279/2 X 3,792,856  2/1974  Hernandez .......................... 279/2 R

FOREIGN PATENT DOCUMENTS 1,131,486  3/1960  Fed. Rep. of Germany ............. 279/2

*Primary Examiner*—Harold D. Whitehead
*Attorney, Agent, or Firm*—Irving M. Weiner

[57] ABSTRACT

A workpiece or a tool which is clamped co-axially to a circular base by interposing a deformable sleeve between the base and the workpiece or tool. The sleeve is then deformed to clamp the two members together. When the members are assembled before deformation of the sleeve, there is a clearance between the sleeve and one of the members, this clearance being largest at the end where the deformation force is applied. The sleeve has mutually offset inner and outer radial recesses, and similarly offset inner and outer clamping base points.

6 Claims, 5 Drawing Figures

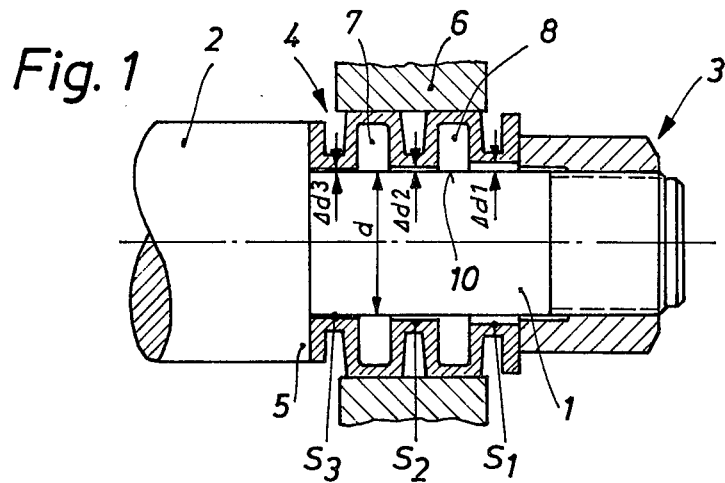
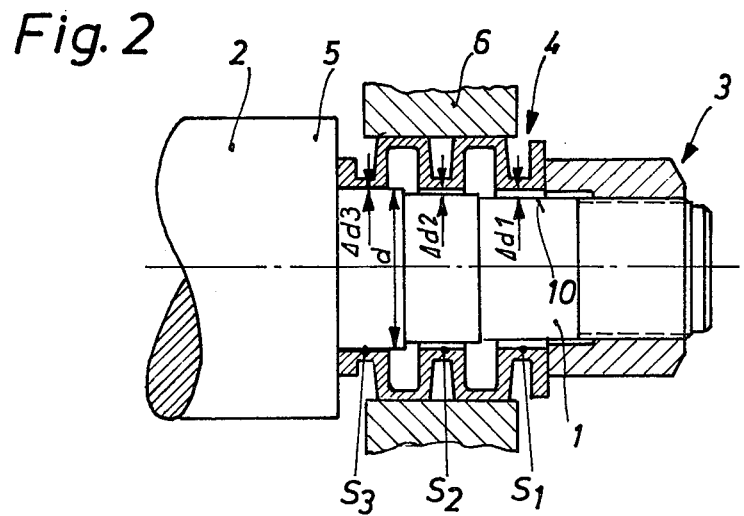
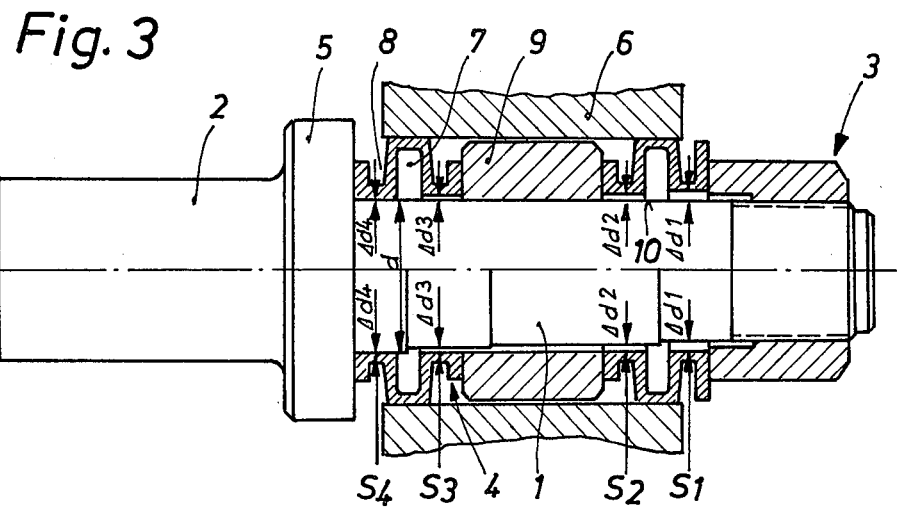

CLAMPING DEVICE FOR ACCURATELY CENTERING A WORK-PIECE OR A TOOL

The invention relates to a clamping device for accurately centering a workpiece or a tool. The device includes a base body, a clamping sleeve disposed co-axially therewith and a device for exerting a clamping force acting in the direction of one end of the clamping sleeve, wherein the clamping sleeve which comprises inner and outer radial recesses which are disposed mutually off-set, as well as mutually off-set inner and outer clamping base points, is deformable like a cup spring and comprises successively in the axial direction and forming a one-piece clamping sleeve member, at least two clamping base points separated by one of the recesses, which are directed towards an abutment face of the base body, and wherein, when the clamping sleeve is not tensioned, a fit clearance is present between the clamping base points and the abutment face as well as a limitation of power consumption caused by friction during clamping is provided.

Such a clamping device serves for tightly clamping and centering a workpiece or a tool, the clamping point of which is disposed co-axial with the base body and with the clamping sleeve. Tight clamping is effected under the effect of the axial force delivered by the clamping device which deforms the clamping sleeve inwardly and outwardly. When the axial force is sufficient, a friction connection between the base body and the workpiece or tool is obtained. The clearance between the clamping sleeve and the base body decreases as the deformation of the clamping sleeve increases.

Summary of the Invention

According to the invention, there is provided a clamping device for accurately centering a workpiece or a tool, the device comprising a base body, a clamping sleeve co-axially disposed therewith and a device for exerting a clamping force acting in an axial direction upon one end of the clamping sleeve, wherein the clamping sleeve, comprising inner and outer radial recesses disposed mutually off-set as well as inner and outer clamping base points disposed mutually off-set, is deformable like a plate spring and has at least two axially spaced clamping base points separated by one of the recesses in a one-piece sleeve part, which face an abutment face of the base body, and wherein, when the clamping sleeve is not tensioned, a fit clearance is present between the clamping base points and the abutment face wherein only the fit clearance between the clamping sleeve and the base body increases step-like in the direction of the power clamping device from clamping base point to clamping base point by means of diameter gradation.

In this manner, the clamping initiating force in fact attains the clamping base point furthest away from it. Since the fit clearance of the clamping base point lying nearest to the power clamping device is greatest and the fit clearance of the clamping base point most remote from the power clamping device is smallest, a considerable friction contact will not occur at the clamping base point nearest to the power clamping device until the clamping sleeve in the region of the clamping base point most remote from the power clamping device is already radially deformed. The accuracy of the clamping device according to the invention is improved since the clamping sleeve can become effective with approximately the same clamping force in the region of each clamping base point. Since solely the clearance between the clamping sleeve and the base body increases in steps, but not the clearance between the clamping sleeve and the workpiece or tool, the clamping sleeve can sit without wobble in the workpiece or tool prior to clamping.

Since the power consumption caused by friction contact is limited to a minimum, the clamping initiating force applied is nearly completely converted into radial enlargement of the clamping sleeve, whereby the holding force of the clamping device is increased. A defined desired holding force may be obtained with a reduced clamping initiating force by a clamping device according to the invention.

It is possible to provide for the desired diameter gradation an appropriate configuration of the clamping sleeve as well as of the base body. However, it is particularly convenient and advantageous when the diameter gradation is provided either only at the clamping base points of the clamping sleeve or only at the abutment face of the base body. Thereby the diameter gradation is obtained with simplified means.

It is preferred in practice to provide the diameter gradation on the clamping sleeve, because each clamping sleeve can be adjusted afterwards to the respective purpose of use by grinding. On the other hand, as to production it is more economical to provide the diameter gradation at the base body, because then the wear member clamping sleeve is simpler to produce.

The production of a base body or a clamping sleeve with the diameter gradation may be effected per se in any desirable manner. It it particularly convenient and advantageous, however, when the diameter gradation is produced by grinding, since in this manner of production the intended use of the individual clamping device can be taken into account in a simple manner. In particular, the production by grinding of the diameter gradation of a clamping sleeve is particularly advantageous, because at the same time the spring characteristic of the clamping sleeve can be changed by this grinding.

The diameter gradation is either magnitude from step to step, or it increases from step to step in the direction of the power clamping device. It is particularly convenient and advantageous when the extent of the gradation from one clamping base point to the next one amounts to from 3 $\mu$ to 2/10 mm.

A clamping device according to the invention comprises preferably more than two clamping base points, wherein the clamping sleeve may be formed from a plurality of mutually separate parts. In spite of the gradation, the plane of the clamping base points extends as a rule parallel to the center axis, even when the clamping sleeve and the base body are constructed substantially conical. The base body is disposed either within or without the clamping sleeve. The power clamping device is formed by, e.g., a screw-threaded nut which can be screwed onto the base body, a piston-cylinder device, or a lever device.

Preferred constructional forms of the invention are illustrated in the accompanying drawings in partial section.

BRIEF DESCRIPTION OF THE DRAWINGS

FIG. 1 shows a clamping device with a base body disposed in the inside and a single piece, multiple membered clamping sleeve having diameter gradation.

FIG. 2 shows a clamping device with an internally disposed base body having diameter gradation and a one-piece multiple membered clamping sleeve.

FIG. 3 shows a clamping device with an internally disposed base body and a two-piece clamping sleeve, single membered for each part, as well as diameter gradation at the base body or at the clamping sleeve.

DETAILED DESCRIPTION

Figure 4:
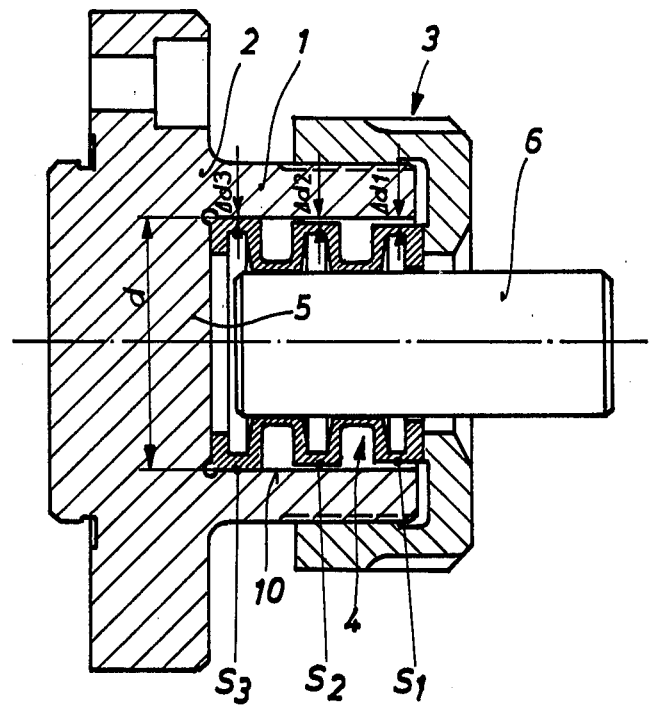
FIG. 4 shows a clamping device with an externally disposed base body and a one-piece multiple membered clamping sleeve having diameter gradation.
Figure 5:
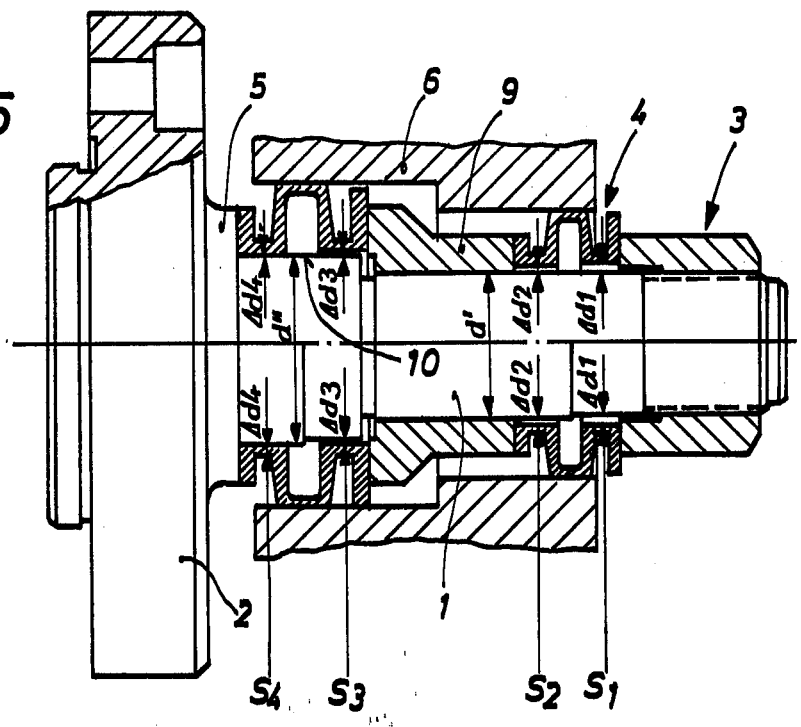
FIG 5 shows a clamping device with an internally disposed base body and a two-piece clamping sleeve, single membered for each part, as well as with diameter gradation at the base body or the clamping sleeve.

The clamping devices shown in the drawings all possess a base body 1 which, according ito FIGS. 1 through 3 and 5, is constructed as a mandrel of circular cross-section and according to FIG. 4 as a cylinder section. At the rear end of the base body, a connector member 2 is attached which serves for fixing the clamping device to a machine. At the forward end of the base body 1 a power clamping device 3 for exerting a clamping force is provided which is, for example, a screw-threaded nut which can be screwed onto the base body. The clamping device 3 engages the forward end of a clamping sleeve 4 which is disposed co-axial with the base body 1 behind the clamping device, and the rear end of which is supported on a counter bearing 5 which is formed substantially by the connector member 2. Co-axially with the base body 1 a tool or workpiece 6 is provided, the clamping sleeve 4 being disposed between the workpiece and the base body.

The clamping sleeve 4 is a rotation symmetrical-cylindrical hollow body which comprises inner recesses 7 and outer recesses 8 each of which extends in a radial direction and around the clamping sleeve. According to FIGS. 1, 2 and 4 the clamping sleeve 4 is in one piece, whereas it is in two pieces according to FIGS. 3 and 5, with a spacer bush 9 being disposed between the two parts. The clamping device according to FIG. 5 serves for clamping a workpiece 6 with a stepped bore, the forward portion of the clamping sleeve 4 having a smaller mean diameter than the rear portion. In this case the base body 1 is of stepped diameter corresponding to the different mean diameters of the two parts of the clamping sleeve. Each clamping sleeve 4, according to the drawing, faces the base body 1 with clamping base points S1, S2 . . . Sn extending round it, the clamping base point S1 being nearest the power clamping device 3 and the clamping base point Sn nearest the counter bearing 5. The constructional forms according to FIGS. 1, 2 and 4 each possess three clamping base points S, whereas the constructional forms according to FIGS. 3 and 5 each possess four clamping base points S. Each of the clamping base points co-operates with an abutment face 10 which is a cylindrical face of the base body 1.

In the non-tensioned state of the clamping sleeve, a fit clearance $\Delta d$ is present between each clamping base point S and the abutment face 10. The clearances associated with the individual clamping base points S1, S2, S3 and S4 are indicated in the drawing by $\Delta d1$, $\Delta d2$, $\Delta d3$ and $\Delta d4$, respectively. The sizes of the clearances are exaggerated in the drawings for reasons of clarity. The clearances $\Delta d$ increase stepwise in their radial dimension from the counter bearing 5 to the power clamping device 3, i.e. from clamping base point to clamping base point. According to FIG. 1, FIG. 3 (upper portion), FIG. 4 and FIG. 5 (upper portion), the step-like increase of the fit clearance is obtained by a diameter gradation of the clamping sleeve 4, the inner diameter of the clamping sleeve being stepped according to FIG. 1, FIG. 3 (upper portion), and FIG. 5 (upper portion). In contrast, the outer periphery of the clamping sleeve is stepped according to FIG. 4. According to FIG. 2, FIG. 3 (lower portion) and FIG. 5 (lower portion) the diameter of the base body 1 is stepped, i.e., the outer surface of the mandrel-like base body is stepped.

The clamping device of the invention, as above described, possesses an improved centering accuracy and its clamping sleeve renders possible a highly equal radial enlargement over its entire length. As mentioned hereinabove, the accuracy of the clamping device according to the invention is improved because the clamping sleeve 4, in its tensioned condition, is pressed against the contact surface of base body 1 with approximately the same clamping force in the region of every clamping base point. The clamping sleeve must have a defined starting position prior to clamping, i.e., must not wobble.

I claim:

1. A clamping device for accurately centering a workpiece or a tool, comprising:
    a base body;
    a clamping sleeve disposed co-axially with said base body;
    a clamping device for exerting an axial clamping force on one end of said clamping sleeve;
    said clamping sleeve comprising inner and outer radial recesses disposed mutually off-set, and further comprising inner and outer clamping base points disposed mutually off-set;
    said clamping sleeve being substantially deformable in the manner of a plate spring;
    said clamping sleeve being provided with at least two axially-spaced clamping base points, said base points being separated by one of said recesses disposed in a one-piece sleeve part;
    said clamping base points being adapted to face an abutment face of said base body;
    a fit clearance being provided between said clamping base points of said clamping sleeve and said abutment face of said base body when said clamping sleeve is in a substantially nontensioned condition;
    said fit clearance between said clamping sleeve and said base body increasing in a step-like manner in the direction of said clamping device, from clamping base point to clamping base point, by means of diameter gradation; and
    said clamping sleeve being adapted to be pressed against said abutment face of said base body with substantially the same clamping force in the region of each of said clamping base points when said clamping sleeve is in a substantially tensioned condition.

2. A clamping device according to claim 1, characterized in that said clamping sleeve is disposed between said workpiece and said base body.

3. A clamping device according to claim 1, characterized in that said diameter gradation is provided at said clamping base points of said clamping sleeve.

4. A clamping device according to claim 1, characterized in that said diameter gradation is provided at said abutment face of said base body.

5. A clamping device according to claim 1, characterized in that said diameter gradation is produced by grinding.

6. A clamping device according to claim 1, characterized in that the measure of said gradation from one clamping base point to the next one amounts to from 3 $\mu$ to 2/10mm.

* * * * *